United States Patent
Cross

(10) Patent No.: US 7,085,383 B2
(45) Date of Patent: *Aug. 1, 2006

(54) SECURED CELLULAR TELEPHONE COMMUNICATIONS SYSTEM, METHOD, AND COMPUTER PROGRAM PRODUCT

(75) Inventor: Gary J. Cross, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 938 days.

This patent is subject to a terminal disclaimer.

(21) Appl. No.: 10/042,496

(22) Filed: Jan. 9, 2002

(65) Prior Publication Data

US 2003/0131230 A1    Jul. 10, 2003

(51) Int. Cl.
*H04K 1/00* (2006.01)
*H04L 9/30* (2006.01)
*H04L 9/12* (2006.01)

(52) U.S. Cl. .................... 380/270; 380/247; 713/150
(58) Field of Classification Search ........... 380/270, 380/247; 713/150
See application file for complete search history.

(56) References Cited

U.S. PATENT DOCUMENTS

| | | | |
|---|---|---|---|
| 5,305,384 A | 4/1994 | Ashby et al. ............. 380/29 |
| 5,410,599 A | 4/1995 | Crowley et al. ............ 380/9 |
| 5,519,778 A | 5/1996 | Leighton et al. ........... 380/30 |
| 5,581,576 A | 12/1996 | Lanzetta et al. .......... 376/216 |
| 5,815,553 A * | 9/1998 | Baugh et al. .......... 379/88.17 |
| 5,880,721 A | 3/1999 | Yen ....................... 345/327 |
| 5,909,491 A * | 6/1999 | Luo ........................ 380/270 |
| 5,915,021 A * | 6/1999 | Herlin et al. ............. 705/67 |
| 5,963,621 A | 10/1999 | Dimolitsas et al. ....... 379/93.08 |
| 5,978,481 A | 11/1999 | Ganesan et al. ........... 380/18 |
| 6,044,158 A | 3/2000 | Terpening et al. ......... 380/255 |
| 6,151,677 A * | 11/2000 | Walter et al. ............. 713/183 |
| 6,169,805 B1 | 1/2001 | Dunn et al. ............... 380/277 |
| 6,233,577 B1 | 5/2001 | Ramasubramani et al. ... 707/9 |
| 6,246,672 B1 | 6/2001 | Lumelsky ................ 370/310 |

OTHER PUBLICATIONS http://www.cirrus.com/design/products/overview/detail.cfm?d=256, "High Performance, Low Power, System-on-Chip, Enhanced Digitial Audio Interface", Cirrus Logic Design Center, Feb. 20, 2002, pp. 1-2.

* cited by examiner

*Primary Examiner*—Matthew Smithers
(74) *Attorney, Agent, or Firm*—Duke W. Yee; David A. Mims, Jr.; Theodore D. Fay, III

(57) ABSTRACT

A data processing system, method, and product are disclosed for securing cellular telephone transmissions utilizing a conventional cellular telephone. A conventional cellular telephone and a computer system are provided. The computer system is separate and apart from the conventional cellular telephone. The conventional cellular telephone is capable of receiving an input signal from an external microphone and then transmitting that input signal using cellular technology. The conventional cellular telephone is incapable of encrypting the input signal.

The computer system is coupled between the external microphone and the cellular telephone such that inputs into the external microphone are received first by the computer system. The computer system receives an input from the microphone, encrypts the input utilizing public key encryption, and passes the encrypted input to the cellular telephone. The cellular telephone then transmits the encrypted input using cellular technology. Thus, cellular telephone transmissions from the conventional cellular telephone are secured.

30 Claims, 4 Drawing Sheets

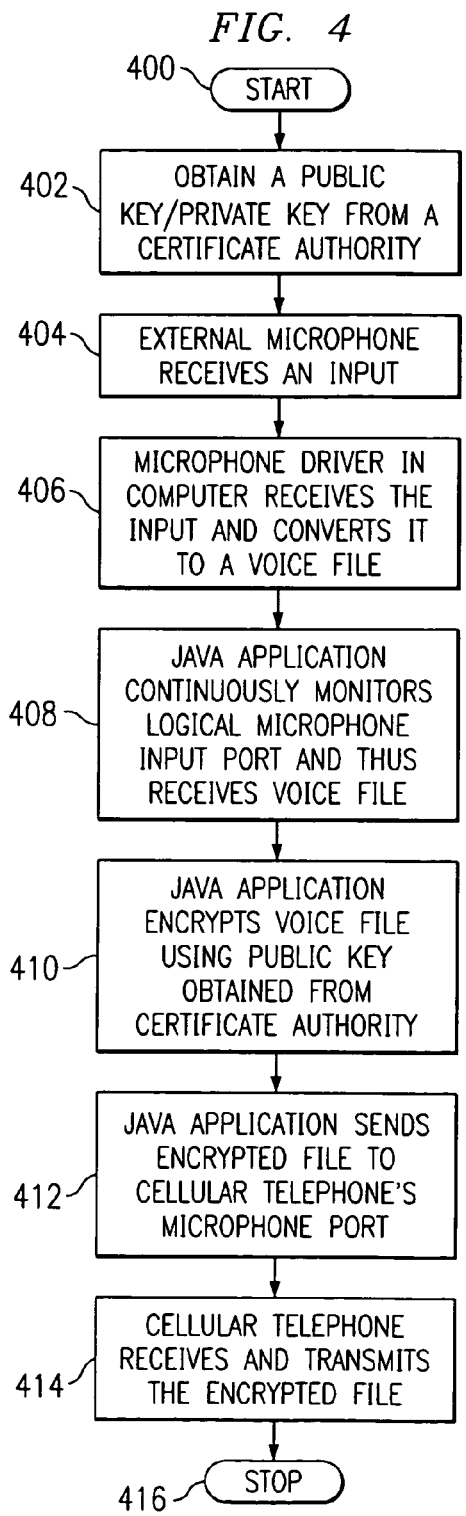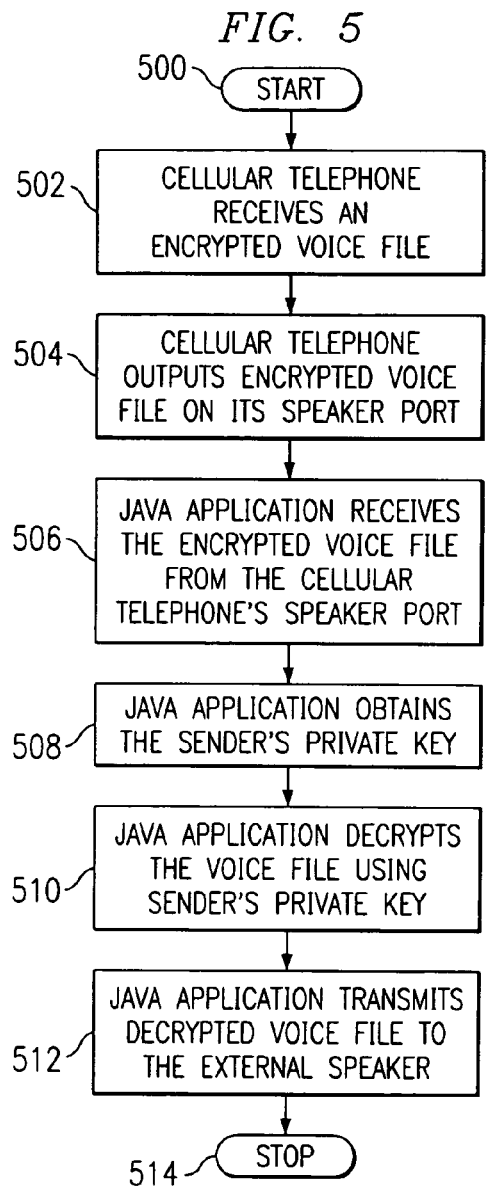

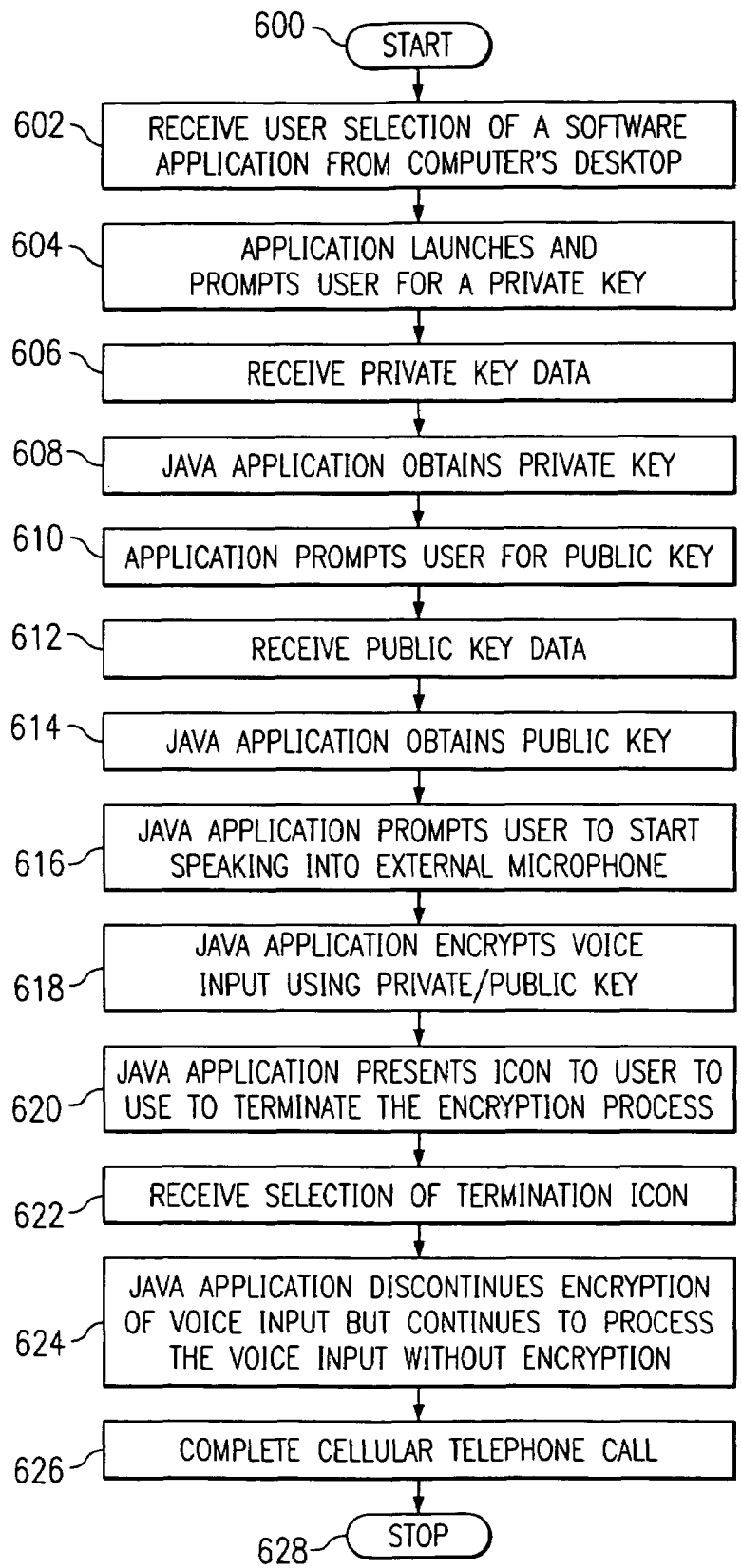

SECURED CELLULAR TELEPHONE COMMUNICATIONS SYSTEM, METHOD, AND COMPUTER PROGRAM PRODUCT

CROSS-REFERENCE TO RELATED APPLICATIONS

The present invention is related to the subject matter of co-pending U.S. patent application Ser. No. 10/042,505 entitled "SECURED RADIO COMMUNICATIONS SYSTEM, METHOD, AND COMPUTER PROGRAM PRODUCT", assigned to the assignee named herein filed on the same date and incorporated by reference.

BACKGROUND OF THE INVENTION

1. Technical Field

The present invention relates generally to the field of cellular telephone communications, and more specifically to a data processing system, method, and computer program product for transmitting secure cellular telephone communications utilizing a conventional cellular telephone.

2. Description of Related Art

Conventional cellular telephones transmit and receive information utilizing radio signals. Conventional cellular telephones receive inputs typically either from an internal microphone included encased within the telephone or from a microphone that is external to the telephone and coupled to a microphone port on the cellular telephone. Inputs received from either microphone are then transmitted by the cellular telephone at a particular frequency. This radio frequency is capable of being monitored by contemporary radio scanners.

Cellular telephones are available that receive and transmit either analog signals or digital signals. When a conventional cellular telephone receives a signal, the receiving cellular telephone processes the signal in order to output that signal to a speaker. The signal may be output to the internal speaker that is encased within a telephone, or output to a speaker that is external to the telephone. When a conventional cellular telephone receives an encrypted signal, the cellular telephone has no means by which to decrypt the signal.

Palm held computer systems are well known in the art. They have attained widespread use for providing computer power to many segments of today's modern society. Palm held computers may be defined as a palm held computer, embedded controller, or embedded controller that includes a system unit having a central processing unit (CPU) and associated volatile and non-volatile memory. The palm held computer may also include random access memory (RAM), basic input/output system read only memory (BIOS ROM), an attached LCD display touchscreen, a pointing device which uses a stylist, optional serial ports, parallel ports, infrared ports, a wireless modem, analog-to-digital converter (ADC), digital-to-analog converter (DAC), general purpose I/O ports for augmenting the palm held computer/embedded computer, and/or CODEC devices for connecting to the Public Telephone Switched Network. One of the distinguishing characteristics of these palm held systems is that the components are modular enough to fit on a system board that fits into the user's hand and is powered by batteries. Another distinguishing characteristic of the palm help computers is their ability to download software applications via an uplink that is connected to a desktop computer.

Secured cellular telephone communications are essential to the military. However, they must purchase specialized equipment in order to transmit and receive secured radio communications.

Encryption algorithms are known to ensure that only the intended recipient of an electronic message may read and access the message. One known encryption algorithm is an asymmetric, or public key, algorithm. The public key algorithm is a method for encrypting electronic messages sent from a first entity to a second entity. This algorithm provides for a key pair comprised of a private key and public key which are mathematically related such that if the private key is used to encrypt data then only the matched public key can be used to decrypt the data, and visa versa.

Encryption keys may be obtained from a certificate authority. Certificate Authorities are entities that can issue digital certificates. Certificate Authorities are, in essence, a commonly trusted third party that is relied upon to verify the matching of public keys to identity, e-mail name, or other such information.

Therefore, a need exists for a method, system, and product for transmitting secure cellular telephone communications utilizing a conventional cellular telephone.

SUMMARY OF THE INVENTION

A data processing system, method, and product are disclosed for securing cellular telephone transmissions utilizing a conventional cellular telephone. A conventional cellular telephone and a computer system are provided. The computer system is separate and apart from the conventional cellular telephone. The conventional cellular telephone is capable of receiving an input signal from an external microphone and then transmitting that input signal using cellular technology. The conventional cellular telephone is incapable of encrypting the input signal.

The computer system is coupled between the external microphone and the cellular telephone such that inputs into the external microphone are received first by the computer system. The computer system receives an input from the microphone, encrypts the input utilizing public key encryption, and passes the encrypted input to the cellular telephone. The cellular telephone then transmits the encrypted input using cellular technology. Thus, cellular telephone transmissions from the conventional cellular telephone are secured.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a high level flow chart which illustrates a secured cellular telephone communications system receiving a voice file via an external microphone, encrypting the voice file, and transmitting the encrypted voice file in accordance with the present invention;

FIG. 5 illustrates a high level flow chart which depicts a secured cellular telephone communications system receiving an encrypted voice file, decrypting the received voice file, and outputting via an external speaker the decrypted voice file in accordance with the present invention; and FIG. 6 depicts a high level flow chart which illustrates the selection and de-selection of secured transmissions in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a data processing system, method, and computer program product for securing cellular telephone communications utilizing a conventional cellular telephone. A secured cellular telephone communications system includes a conventional cellular telephone, a separate computer system, an external microphone, and an external speaker. The computer system is coupled to the cellular telephone through a direct wire connection or through wireless technology. The conventional cellular telephone alone is not capable of encrypting or decrypting signals.

A signal may be received by the external microphone which is direct wire connected to the computer system. The computer system then receives the signal from the microphone before the signal is input into the cellular telephone. The computer system digitizes the analog signal, converts it to an audio file, encrypts the audio file using public key encryption technology, and transmits it to the cellular telephone through a direct wire connect to the cellular telephone's input microphone port. The cellular telephone then transmits the encrypted audio file to its destination, a second secured cellular telephone communications system.

The second secured cellular telephone communications system receives the encrypted audio file and transmits it to its speaker port to be output to an external speaker. The second secured cellular telephone also has a computer system that is direct wire connected to the second secured cellular telephone's speaker port. The second secured cellular telephone's computer system receives the encrypted audio file through a direct wire connect or wireless technology, decrypts the encrypted audio file, and then outputs the decrypted audio file through the direct wire to the external speaker.

The first and second secured cellular telephone communications systems may exchange encryption keys using one of many different methods. For example, the two computer systems may exchange keys prior to any transmissions.

Figure 1:
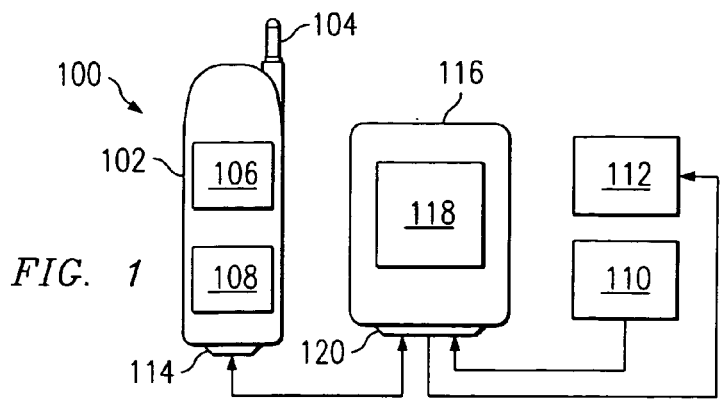
FIG. 1 is a pictorial representation of a secured cellular telephone communications system in accordance with the present invention.

FIG. 1 is a pictorial representation of a secured cellular telephone communications system in accordance with the present invention. Cellular communications are established using cellular telephone 102 which includes an antenna 104, an LCD display 106, and a keypad 108. LCD display 106 is a web browser and cellular programming interface. Keypad 108 can be used for desired telephone keypad data entry and cellular programming application data entry from users. Cellular telephone 102 includes ports 114 for peripheral attachments, such as external microphone 110 and external speaker 112. Input/output (I/O) ports 114 are utilized for direct wire attachments of microphone 110 and speaker 112. A data processing system 116, such as a palm held device, may include an LCD display 118 which is a user interface to computer 116. Computer 116 includes communications ports 120, which can be used to communicate with both digital and analog peripheral devices, such as cellular telephone 102, microphone 110, and/or speaker 112. FIG. 1 is intended as an example, and not as an architectural limitation for the present invention.

Figure 2:
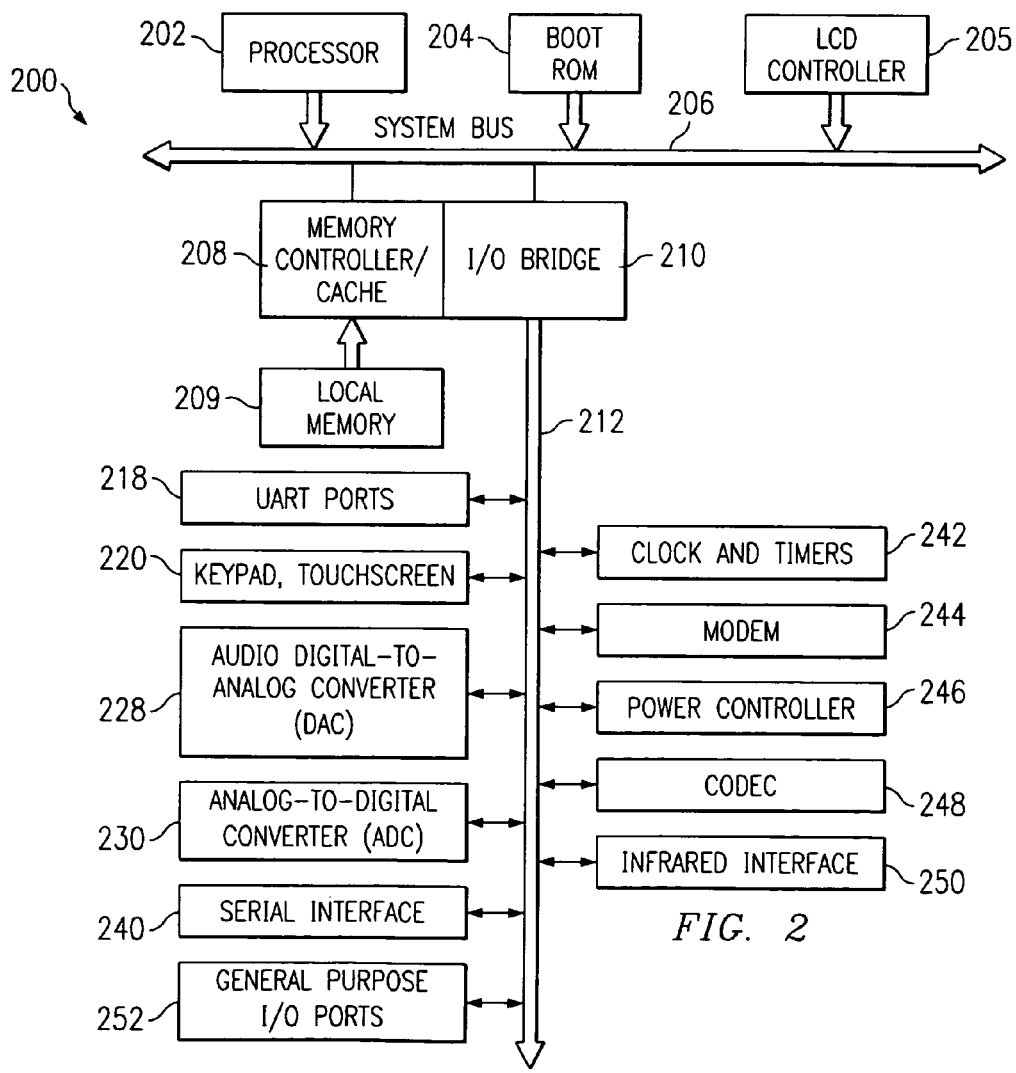
FIG. 2 is a block diagram of the data processing system of FIG. 1 in accordance with the present invention.

FIG. 2 is a block diagram of a data processing system 200 that may be implemented as computer system 116 of FIG. 1 in accordance with the present invention. Data processing system 200 includes a processor 202, boot ROM 204, and LCD controller 205 coupled to system bus 206. LCD controller 205 provides the graphical interface. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral components are connected via I/O bus 212. Typical peripheral components include UART (Universal Asynchronous Receiver Transmitter) 218, a keypad or touchscreen 220, digital-to-analog converters 228, analog-to-digital converter 230, serial interface controller 240, clocks and timers 242, modem 244, power controller 246, CODEC ports 248 for communicating with the Public Telephone Switch, infrared ports 250, and general purpose I/O ports 252. Communications links to cellular telephone 102 in FIG. 1 may be provided through Infrared port 250.

Those of ordinary skill in the art will appreciate that the hardware depicted in FIG. 2 may vary. For example, other peripheral devices, such as infrared wireless Internet connections, also may be used in addition to or in place of the hardware depicted. The depicted example is not meant to imply architectural limitations with respect to the present invention.

The data processing system depicted in FIG. 2 may be, for example, a separate, embedded controller, such as model number EP3712 available from CIRRUS Corporation.

Figure 3:
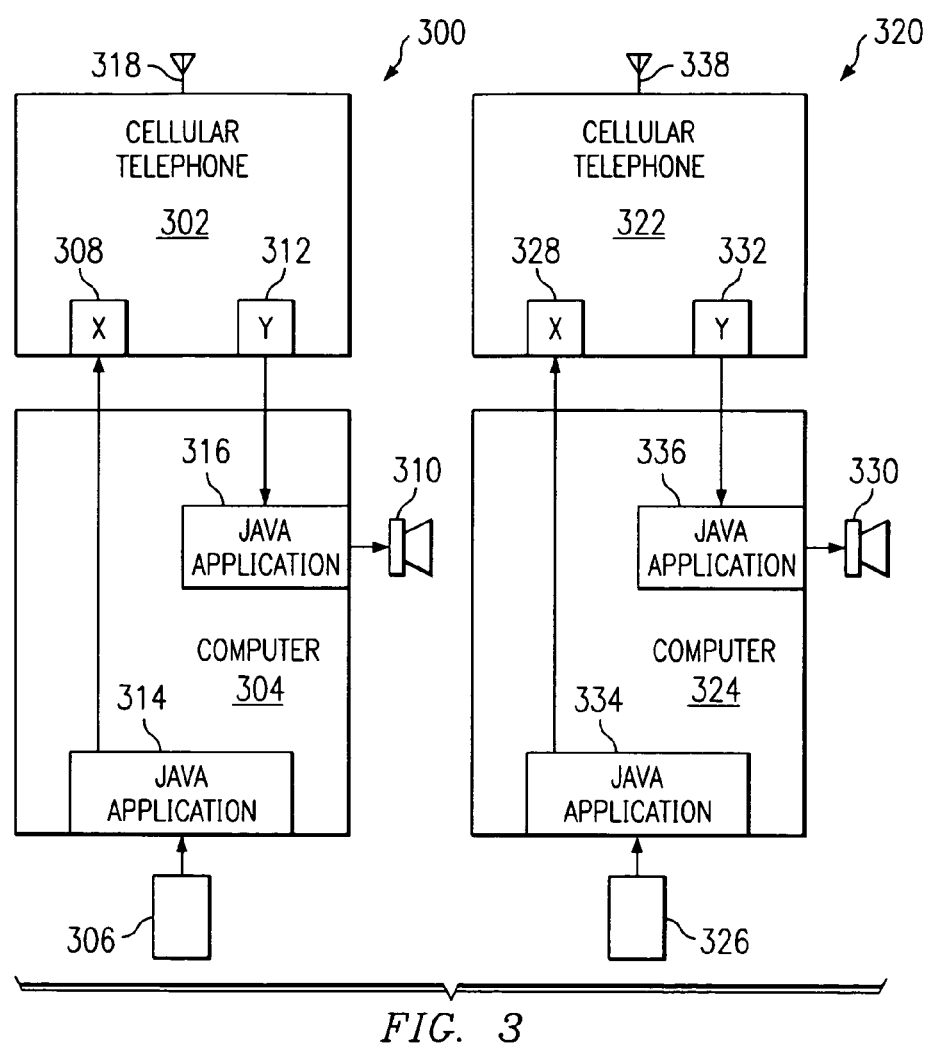
FIG. 3 is a block diagram of two secured cellular telephone communications systems in accordance with the present invention.

FIG. 3 is a block diagram of two secured cellular telephone communications systems in accordance with the present invention. A first secured cellular telephone communications system 300 includes a conventional cellular telephone 302, and a separate computer system 304. Computer system 304 is interconnected between an external microphone 306, which is similar to microphone 110, and a microphone port 308 input into cellular telephone 302. Computer system 304 is also interconnected between an external speaker 310, which is similar to speaker 112, and a speaker port 312 output from cellular telephone 302.

A Java application 314, being executed by computer system 304, constantly monitors a logical input microphone port and receives input voice data from microphone 306. Another Java application 316, also being executed by computer system 304, constantly monitors speaker port 312, receives voice data from cellular telephone 302, and outputs voice data using speaker 310.

Secured cellular telephone communications system 300 may transmit cellular telephone signals to and receive cellular telephone signals from another secured cellular telephone communications system, such as system 320, using an antenna 318.

Secured cellular telephone communications system 320 includes a conventional cellular telephone 322, and a computer system 324. Computer system 324 is interconnected between a microphone 326 and a microphone port 328 input into cellular telephone 322. Computer system 324 is also interconnected between a speaker 330 and a speaker port 332 output from cellular telephone 322.

Computer system 200 may be utilized to implement computer system 304 or computer system 324.

A Java application 334, being executed by computer system 324, constantly monitors a logical input microphone port and receives input voice data from microphone 326. Another Java application 336, also being executed by computer system 324, constantly monitors speaker port 332, receives voice data from cellular telephone 322, and outputs voice data using speaker 330.

Secured cellular telephone communications system 324 may transmit cellular telephone signals to and receive cellular telephone signals from another secured cellular telephone communications system, such as system 300, using an antenna 338.

When secured cellular telephone communications system 300 receives an input through microphone 306, a microphone driver executing within computer system 304 receives the input data and puts that data into a standardized format voice file, such as a "wav" file. Java application 314, which is constantly monitoring the logical microphone input port, detects the receipt of this voice file. Java application 314 then encrypts the voice file and transmits the encrypted voice file to the physical microphone input port 308 located within cellular telephone 302. Cellular telephone 302 transmits this encrypted voice file using antenna 318 and known technology.

Cellular telephone 322 included within secured cellular telephone communications system 320 receives, through antenna 338, a cellular telephone transmission of an encrypted voice file. Cellular telephone 322 outputs the received encrypted voice file through its physical speaker output port 332. Java application 336, which is constantly monitoring speaker output port 332, receives this encrypted voice file. Java application 336 then obtains the private key of secured cellular telephone communications system 320. Java application 336 decrypts the encrypted voice file using the obtained private key. Java application then outputs the decrypted voice file through speaker 330.

In a manner similar to that described above, system 320 obtains a public key/private key pair from a certificate authority as known in the art. System 320 then receives a voice input through microphone 326. Java application 334, encrypts the input voice file, and outputs the encrypted file to microphone port 328. Cellular telephone 322 transmits the encrypted file using antenna 338.

Cellular telephone 302 receives the encrypted file using antenna 318 and outputs the received file through speaker port 312. Java application 316 then receives the encrypted file, obtains the private key of system 320, uses this private key to decrypt the received encrypted file, and then outputs the decrypted file using speaker 310. Public and private keys may be shared among secured cellular telephone communications systems as described above. For example, the keys may be exchanged prior to the use of the systems.

FIG. 4 depicts a high level flow chart which illustrates a secured cellular telephone communication system receiving a voice file from an external microphone, encrypting the voice file, and transmitting the encrypted voice file in accordance with the present invention. The process starts as depicted by block 400 and thereafter passes to block 402 which illustrates a secured cellular telephone communications system obtaining a public key and private key from a certificate authority. In a preferred embodiment, both the sender and the receiver of the cellular transmission will share the private key and public key in a manner such as described by U.S. Pat. No. 6,169,805 B1, which is herein incorporated by reference. Next, block 404 depicts an external microphone included in the secured cellular telephone communications system receiving a voice input. Block 406 illustrates a microphone driver in a computer system that is a part of the secured cellular telephone communications system receiving the voice input and converting it to a voice file. This voice file may be in a standard format, such as a "wav" format.

The process then passes to block 408 which depicts a Java application that is continuously executing within the computer system monitoring a logical microphone input port. The Java application will thus receive the voice file from the microphone driver. Next, block 410 illustrates the Java application encrypting the voice file using the public key obtained from the certificate authority. Thereafter, block 412 depicts the Java application sending the encrypted file to the cellular phone's input microphone port. The cellular telephone is also included within this secured cellular telephone communications system. Next, block 414 illustrates this cellular telephone receiving the encrypted file through its microphone port and then transmitting the encrypted file. The process then terminates as depicted by block 416.

FIG. 5 illustrates a high level flow chart which depicts a secured cellular telephone communication system receiving an encrypted voice file, decrypting the received voice file, and outputting via an external speaker the decrypted voice file in accordance with the present invention. The process starts as depicted by block 500 and thereafter passes to block 502 which illustrates a cellular telephone included within a secured cellular telephone communications system receiving an encrypted voice file. Next, block 504 depicts the cellular telephone outputting this encrypted voice file on its output speaker port. Block 506, then, illustrates a Java application that is executing on a computer included within this secured cellular telephone communications system receiving the encrypted voice file from the cellular phone's speaker port.

The process then passes to block 508 which depicts the Java application obtaining the private key of the system that sent the voice file. This private key may be obtained using any one of many different methods. One simple approach would be for the sending secured cellular telephone communications system and the receiving secured cellular telephone communications to exchange one or more keys prior to any cellular telephone transmission.

Thereafter, block 510 illustrates the Java application decrypting the voice file using the sender's private key. Next, block 512 depicts the Java application transmitting the decrypted voice file to an external speaker included within the secured cellular telephone communications system. The process then terminates as illustrated by block 514.

FIG. 6 depicts a high level flow chart which illustrates the selection and de-selection of secured transmissions in accordance with the present invention. The process starts as depicted by block 600 and thereafter passes to block 602 which illustrates a selection by a user of a software application using the computer system's desktop. Next, block 604 depicts the application launching and prompting a user for an entry of a private key. The process then passes to block 606 which illustrates the entry of a private encryption key. Thereafter, block 608 depicts the Java application obtaining the private encryption key. The Java application acknowledges that the user has entered data to be used as an encryption key before starting computation processing.

Thereafter, the process passes to block 610, which depicts the applicaton prompting a user for entry of a public key. Thereafter, block 612 illustrates receiving the public key data. Next, block 614 depicts the Java application obtaining the public key. Next, block 616 illustrates the Java application prompting a user to begin speaking into the external microphone.

The process then passes to block 618 which depicts the Java application encrypting the voice input into the external speaker. This step is described in more detail above with reference to FIG. 4. Thereafter, block 620 illustrates the Java application presenting an icon that may be selected by a user to terminate the encrypted cellular telephone call. Next, block 622 depicts a selection of the icon in order to terminate the encrypted call. The process then passes to block 624 which illustrates the Java application discontinuing the encryption of inputs received using the external microphone. The Java application will continue to process voice inputs, but without encrypting them. Therefore, the telephone call may continue un-encrypted. Block 626, then, depicts the encrypted cellular telephone call being complete. The process then terminates as depicted by block 628.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, cellular telephone frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for securing cellular telephone transmissions utilizing a conventional cellular telephone, said method comprising the steps of:
   providing a conventional cellular telephone, said conventional cellular telephone being incapable of independently encrypting or decrypting signals;
   providing a computer system coupled between an external microphone and said conventional cellular telephone, wherein inputs into said conventional cellular telephone are received first by said computer system, said computer system being separate and apart from said conventional cellular telephone;
   receiving, within said computer system, an input signal from said external microphone;
   encrypting within said computer system, said input signal utilizing public key encryption to form an encrypted input signal;
   passing said encrypted input signal from said computer system to said conventional cellular telephone; and
   transmitting said encrypted input signal utilizing said conventional cellular telephone, wherein cellular telephone transmissions from said conventional cellular telephone are secured.

2. The method according to claim 1, further comprising the step of encrypting, within said computer system, said input signal utilizing a key pair to form the encrypted input signal, said key pair including a public key and a private key.

3. The method according to claim 2, further comprising the step of encrypting, within said computer system, said input signal utilizing said public key to form the encrypted input signal.

4. The method according to claim 1, further comprising the steps of:
   receiving, within a Java application executing within said computer system, said input signal from said external microphone;
   encrypting, utilizing said Java application, said input signal utilizing public key encryption to form the encrypted input signal; and
   passing said encrypted input signal from said Java application to said conventional cellular telephone.

5. The method according to claim 1, further comprising the step of passing said encrypted input signal from said computer system to a microphone port included in said conventional cellular telephone.

6. The method according to claim 1, further comprising the steps of:
   providing a second conventional cellular telephone, said second conventional cellular telephone being incapable of independently encrypting or decrypting signals;
   providing a second computer system coupled between an external speaker and said second conventional cellular telephone, wherein outputs from said second conventional cellular telephone are received first by said second computer system before being output to said speaker, said second computer system being separate and apart from said second conventional cellular telephone;
   receiving, within said second computer system, an encrypted output from a speaker port included within said second conventional cellular telephone;
   decrypting, within said second computer system, said encrypted output utilizing public key encryption to form decrypted output; and
   outputting said decrypted output from said second computer system to said external speaker.

7. The method according to claim 6, further comprising the step of encrypting, within said computer system, said input signal utilizing a key pair to form the encrypted input signal, said key pair including a public key and a private key.

8. The method according to claim 7, further comprising the step of encrypting, within said computer system, said input signal utilizing said public key to form the encrypted input signal.

9. The method according to claim 8, further comprising the steps of:
   obtaining, by said second computer system, said private key of said computer system; and
   decrypting said encrypted input signal utilizing said private key to form decrypted input.

10. The method according to claim 9, further comprising the step of exchanging said private key between said computer system and said second computer system prior to transmission of cellular telephone signals.

11. A system for securing cellular telephone transmissions utilizing a conventional cellular telephone, comprising:
- a conventional cellular telephone, said conventional cellular telephone being incapable of independently encrypting or decrypting signals;
- a computer system coupled between an external microphone and said conventional cellular telephone, wherein inputs into said conventional cellular telephone are received first by said computer system, said computer system being separate and apart from said conventional cellular telephone;
- said computer system capable of receiving an input signal from said microphone;
- said computer system capable of encrypting said input signal utilizing public key encryption to form an encrypted input signal;
- said computer system capable of passing said encrypted input signal from said computer system to said conventional cellular telephone; and
- said conventional cellular telephone capable of transmitting said encrypted input signal, wherein cellular telephone transmissions from said conventional cellular telephone are secured.

12. The system according to claim 11, wherein said computer system is capable of encrypting said input signal utilizing a key pair to form the encrypted input signal said key pair including a public key and a private key.

13. The system according to claim 12, wherein said computer system is capable of encrypting said input signal utilizing said public key to form the encrypted input signal.

14. The system according to claim 11, wherein a Java application executing within said computer system receives said input signal from said microphone;
- encrypts said input signal utilizing public key encryption to form the encrypted input signal; and
- passes said encrypted input signal from said Java application to said conventional cellular telephone.

15. The system according to claim 11, wherein said computer system is capable of passing said encrypted input signal from said computer system to a microphone port included in said conventional cellular telephone.

16. The system according to claim 11, further comprising:
- a second conventional cellular telephone, said second conventional cellular telephone being incapable of independently encrypting or decrypting signals;
- a second computer system coupled between an external speaker and said second conventional cellular telephone, wherein outputs from said second conventional cellular telephone are received first by said second computer system before being output to said speaker, said second computer system being separate and apart from said second conventional cellular telephone;
- said second computer system capable of receiving an encrypted output from a speaker part included within said second conventional cellular telephone;
- said second computer system capable of decrypting said encrypted output utilizing public key encryption to form decrypted output; and
- said second computer system capable of outputting said decrypted output from said second computer system to said speaker.

17. The system according to claim 16, wherein said computer system is capable of encrypting said input signal utilizing a key pair to form the encrypted input signal, said key pair including a public key and a private key.

18. The system according to claim 17, wherein said computer system is capable of encrypting said input signal utilizing said public key to form the encrypted input signal.

19. The system according to claim 18,
- wherein said second computer system is capable of obtaining said private key of said computer system; and
- said second computer system is capable of decrypting said encrypted input signal utilizing said private key to form the encrypted input signal.

20. The system according to claim 19, wherein said computer system is capable of exchanging said private key between said computer system and said second computer system prior to transmission of cellular telephone signals.

21. A computer program product comprising:
- a computer usable medium having computer usable program code for securing a cellular telephone transmission utilizing a conventional cellular telephone, said computer program product including:
- computer usable program code for first receiving inputs intended for the conventional cellular phone into a computer system coupled between an external microphone and the conventional cellular telephone, wherein the conventional cellular telephone is capable of encrypting or decrypting signals and wherein the computer system is separate and apart from the conventional cellular telephone;
- computer usable program code for receiving, within said computer system, an input signal from said microphone;
- computer usable program code for encrypting, within said computer system, said input signal utilizing public key encryption to form an encrypted input signal;
- computer usable program code for passing said encrypted input signal from said computer system to said conventional cellular telephone; and
- computer usable program code for transmitting said encrypted input signal utilizing said conventional cellular telephone, wherein cellular telephone transmissions from said conventional cellular telephone are secured.

22. The computer program product according to claim 21, further comprising computer usable program code for encrypting, within said computer system, said input signal utilizing a key pair to form the encrypted input signal, said key pair including a public key and a private key.

23. The computer program product according to claim 22, further comprising computer usable program code for encrypting, within said computer system, said input signal utilizing said public key to form the encrypted input signal.

24. The computer program product according to claim 21, further comprising:
- computer usable program code for receiving, within a Java application executing within said computer system, said input signal from said microphone;
- computer usable program code for encrypting, utilizing said Java application, said input signal utilizing public key encryption to form the encrypted input signal;
- computer usable program code for passing said encrypted input signal from said Java application to said conventional cellular telephone.

25. The computer program product according to claim 21, further comprising computer usable program code for passing said encrypted input signal from said computer system to a microphone port included in said conventional cellular telephone.

26. The computer program product according to claim 21, further comprising:
- computer usable code for receiving outputs from a second conventional cellular telephone at a second computer system, wherein outputs are received before being output to an external speaker between the second conventional cellular telephone and the second computer system, wherein the second conventional cellular telephone is incapable of independently encrypting or decrypting signal, and wherein the second computer system is separate and apart form the second conventional cellular telephone;
- computer usable program code for receiving, within said second computer system, an encrypted output from a speaker port included within said second conventional cellular telephone;
- computer usable program code for decrypting, within said second computer system, said encrypted output utilizing public key encryption to form a decrypted output; and
- computer usable program code for outputting said decrypted output from said second computer system to said speaker.

27. The computer program product according to claim 26, further comprising computer usable program code for encrypting, within said computer system, said input signal utilizing a key pair to form the encrypted input signal, said key pair including a public key and a private key.

28. The computer program product according to claim 27, further comprising computer usable program code for encrypting, within said computer system, said input signal utilizing said public key to form the encrypted input signal.

29. The computer program product according to claim 28, further comprising:
- computer usable program code for obtaining, by said second computer system, said private key of said computer system; and
- computer usable program code for decrypting said encrypted input signal utilizing said private key to form the decrypted input signal.

30. The computer program product according to claim 29, further comprising computer usable program code for exchanging said private key between said computer system and said second computer system prior to transmission of cellular telephone signals.

* * * * *